May 7, 1974   O. J. REVORD   3,809,566
GYPSUM-BASED BUILDING PRODUCT AND METHOD OF PRODUCING SAME
Filed May 26, 1972   2 Sheets-Sheet 1
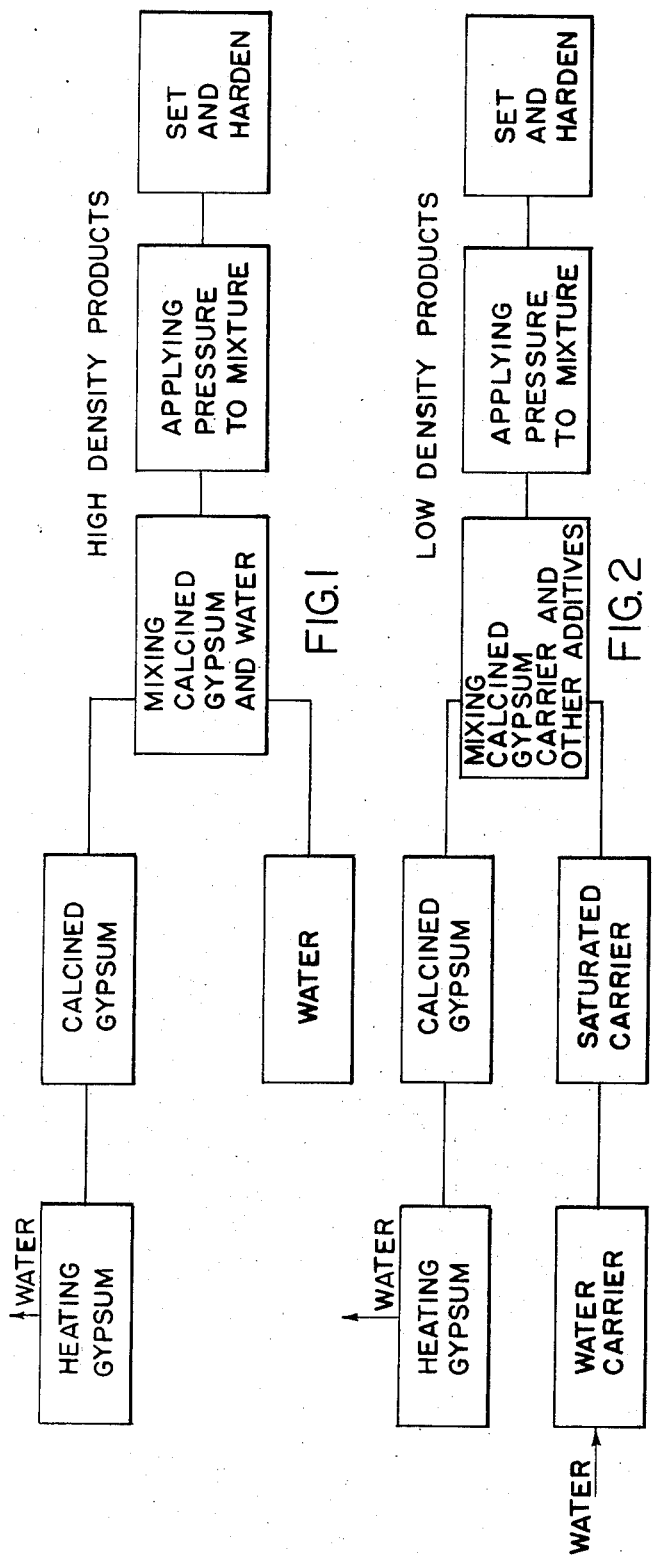
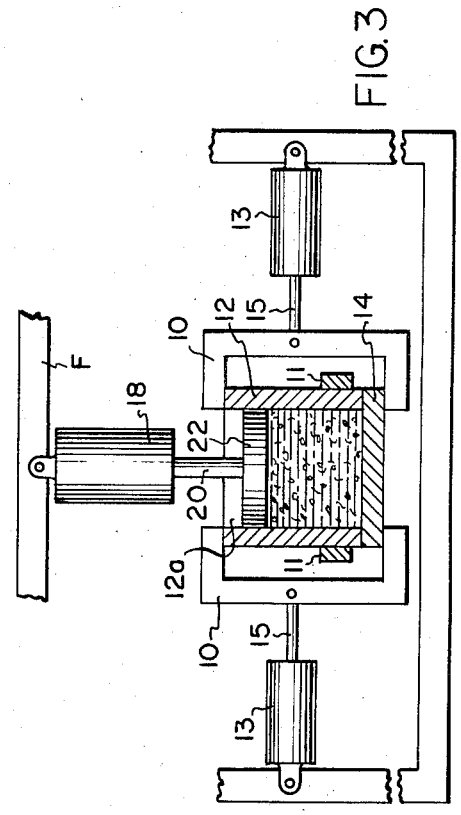

May 7, 1974

O. J. REVORD 3,809,566

GYPSUM-BASED BUILDING PRODUCT AND METHOD OF PRODUCING SAME

Filed May 26, 1972

United States Patent Office 3,809,566
Patented May 7, 1974

3,809,566
GYPSUM-BASED BUILDING PRODUCT AND METHOD OF PRODUCING SAME
Orville J. Revord, Rte. 1, Tawas City, Mich. 48763
Filed May 26, 1972, Ser. No. 257,133
Int. Cl. C04b *11/00*
U.S. Cl. 106—110   3 Claims

ABSTRACT OF THE DISCLOSURE

A method and an apparatus for producing a high density building product with calcined gypsum and a minimum amount of water comprising the step of diffusing the water, under pressure, throughout the calcined gypsum to substantially recrystallize the calcined gypsum.

FIELD OF THE INVENTION

This invention relates to the process and apparatus for producing building material and more particularly to apparatus and method of producing, in a non-slurry process, a high density building product with calcined gypsum.

BACKGROUND OF THE INVENTION

Gypsum has been widely used in producing building products, however, the previous production methods are limited in the types of products that can be produced. To be used as a building material, gypsum is reduced to particle form by grinding the gypsum and then heating the gypsum to drive off all or a major portion of the water of hydration. The dehydrated, comminuted gypsum material is commonly referred to as "processed" or calcined gypsum. The starting material, calcium sulphate hemihydrate $CASO_4 \cdot \frac{1}{2} H_2O$, employed herein to produce building products, is ordinarily prepared, substantially as needed, by calcining gypsum, calcium sulphate, $CASO_4 \cdot 2H_2O$ to remove the desired quantities of water of crystallization. Generally, 3 to 5% water by weight is permitted to remain in the gypsum during calcining, otherwise, the material will "dead-burn." The calcined gypsum is then mixed with water and cast in a mold to the desired shape and the mixture is permitted to set and harden. The quantity of water theoretically necessary to rehydrate and recrystallize the calcined gypsum is equal to the amount of water initially driven off during heating. For substantially pure gypsum, 20.93 cc. of water is contained in one hundred grams of pure hydrated gypsum and thus theoretically only 20.93 grams of water is required to completely rehydrate 79.17 grams of completely dehydrated, pure gypsum.

If the water of rehydration is merely poured into the mass of comminuted calcined gypsum, the water will tend to collect in one area and not disperse throughout the material. In order to insure adequate wetting of all calcined gypsum particles, it has been customary to form a slurry comprising calcined gypsum and a quantity of water substantially greater than the theoretical minimum required for rehydration. In the slurry process, a large proportion of the slurry water evaporates from the product when the product dries or is cured, and only a small amount of slurry water unites chemically with the calcined gypsum. This results in holes and voids being formed throughout the product which reduces the density thereof. Although most slurry processes utilize 40 to 70 cc. of water by weight to one hundred grams of calcined gypsum, in order to adequately wet the gypsum, the calcined gypsum, in setting takes into chemical union only approximately 15% of its weight of water. The remaining water finally evaporates from the mass which results in voids being distributed throughout the mass. Frequently, the voids are near the surface of the product and this frequently results in a thin walled product which lacks desirable strength.

More importantly, however, the presence of excess processing water lengthens the drying time required to cure the finished product before it can be used. Drying machines have been provided to reduce the drying time, but such machines are expensive. Sometimes, after the calcined gypsum is recrystallized, the recrystallized product is then ground into finely comminuted particles which are embedded in poured cementitious material to "set up" a cured gypsum board. When the curing of the calcined product requires a long drying time, the entire process is delayed a similar time. By using the method of the present invention, the drying time can be reduced over 50% over the known processes and the production costs are one-half of the presently known processes.

It is a primary object of the present invention to provide a method of quickly producing a gypsum-based building product.

It is another object of the invention to provide a gypsum-based building product with a minimum amount of water of rehydration.

It is a further object of the invention to provide a method of producing a gypsum-based building composition, which can be used to produce a building product with a minimum of drying time.

It is a still further object of this invention to provide a gypsum-based composition which yields a higher density building product than has been known heretofore.

Other objects and advantages will become apparent to those of ordinary skill in the art as the description thereof proceeds.

THE SUMMARY OF THE INVENTION

This invention makes use of the discovery that a minimum amount of water will form calcium sulphate when the water of rehydration is uniformly diffused throughout conventional calcium sulphate hemihydrate, or calcined gypsum, under pressure. One of the most significant features of this invention is that the resulting product is one of high strength and density.

The present invention may more readily be described by reference to the accompanying drawings in which:

FIG. 1 is a flow diagram schematically illustrating the respective steps of the method;

FIG. 2 is a flow diagram schematically illustrating the steps of a slightly modified method;

FIG. 3 is a sectional, side view illustrating apparatus used in carrying out the method of the invention;

THE METHOD OF PRODUCING VERY HIGH DENSITY BUILDING PRODUCTS

Figure 4:
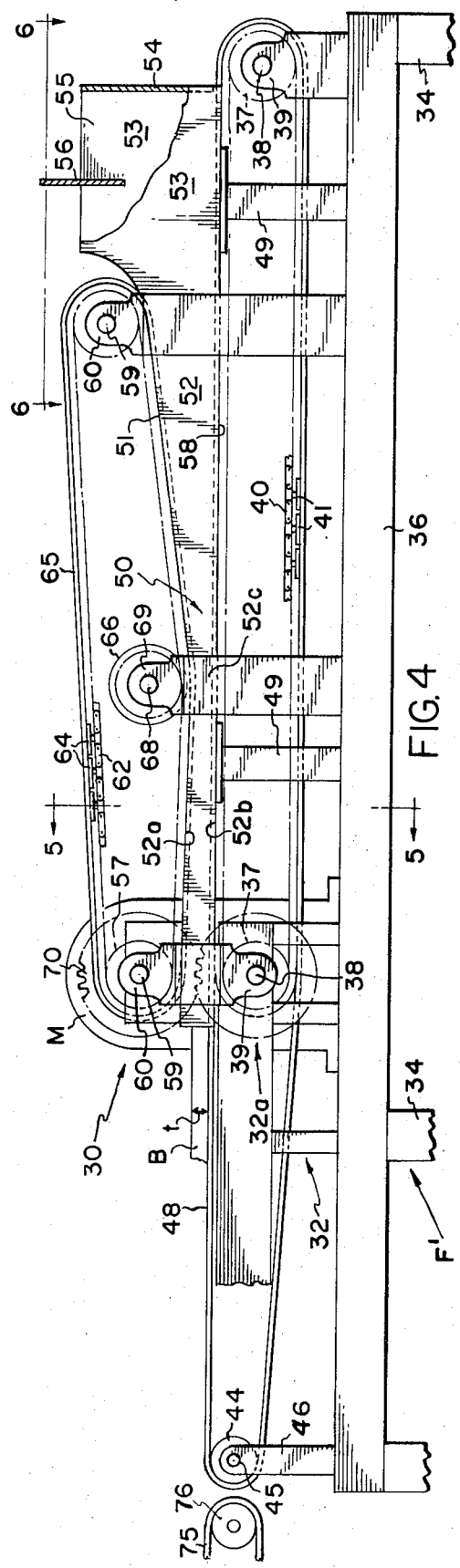
FIG. 4 is a side elevational view of apparatus, constructed according to the invention, for continuously producing a high density building product.

The method of the present invention is put into practice with apparatus, illustrated in FIG. 3, including an open-ended cylindrical mold member 12 supported on a frame F by a bracket 11 and having a material receiving passage 12a therein. A pallet or shelf member 14 is slidable (by apparatus not shown) into snug sealing engagement with the bottom of the cylindrical mold member 12 to close the passage 12a into which an admixture of calcined gypsum and water of rehydration is poured. The frame F supports a pair of double acting, solenoid actuated, fluid pressure operated cylinders 13 having piston rods 15 mounting pairs of opposed C-shaped clamps 10 which clamp the cylindrical mold member 12 and pallet 14 together when the pallet 14 is in the position illustrated in FIG. 2. A frame supported, double acting, solenoid actuated cylinder 18 is provided and includes a piston rod 20, mounting at its terminal end a piston 22, which is in sliding engagement with the wall of the molding cylinder 12.

Referring now more particularly to FIG. 1, the process is practiced by heating gypsum, calcium sulphate, $CASO_4 \cdot 2H_2O$, to drive off a portion of the water of hydration, which, for theoretically pure gypsum, is 20.93 cc. of water per 100 grams of pure gypsum. The calcined gypsum is a pulverized or powdery substance which is then mixed with a quantity of water. Because of various factors, such as surface tension of the water, the water will not disperse throughout the gypsum so that complete rehydration will be effected.

The admixture of water and gypsum is then placed in the mold 12 on the pallet 14 and the cylinder 18 is actuated to advance the piston rod 20 to move the piston 22 downwardly to compress the blended water and gypsum. As the admixture of water and calcined gypsum is compressed, the water is "exploded," dispersed, or diffused substantially uniformly throughout the calcined gypsum. The piston rod 20 is then retracted, the mold clamps 10 are removed, the pallet 14 is removed from the molding cylinder 12 and the piston 20 is further extended to eject the final product downwardly through the opening in the bottom of the molding cylinder 12. The product then sets and the diffused water chemically combines with the calcined gypsum to provide a crystalline mass. It should be understood, of course, that it is not always necessary that the water and calcined gypsum be intermixed prior to the step of applying pressure to disperse water throughout the calcined gypsum.

With this new and novel process, the high density gypsum-based products of this invention were produced from the formulations set forth in the following ten examples. In each example the starting material consists of 100 grams of 86% pure, pulverized gypsum, calcined to 4.8% water. In the first five examples, the pressure is constant and the amount of water added to the mixture is varied for purposes of comparing the percent hydration.

EXAMPLE 1

100 grams of commercially available, 86% pure, gypsum calcined to 4.8% was mixed with 16 cubic centimeters of water and then placed in the mold passage 12a where it was compressed by the piston 22 at a pressure of 7500 p.s.i. The compressed mass was then removed from the passage 12a and permitted to dry in a humidity chest for 24 hours. The resultant product had a density of 2.12 grams per cubic centimeter and a compressive strength in excess of 12,000 p.s.i. After the 24-hour drying period, 17.4% of the resultant product was water and the resultant mass was hydrated to 96.6% but the product had sufficient compressive strength to be used as a completely hydrated product. The hydrated product was submerged in water for 24 hours and then dried until its weight no longer varied with further drying (constant weight), after which time 18% of the resultant product was water.

EXAMPLE 2

100 grams of 4.8% calcined gypsum of 86% purity, was mixed with 17 cc. of water and placed in the mold passage 12a. The admixture was compressed by the piston 22 at a pressure of 7500 p.s.i. The resultant product was then removed and permitted to dry in a humidity chest for approximately 24 hours. At the end of 24 hours, approximately 17.6% of the product was water and the product had a density of 2.12 grams per cubic centimeter and a compressive strength in excess of 12,000 p.s.i. The resultant product was 97.7% hydrated but could be used interchangeably with blocks which were 100% hydrated. The hydrated product was submerged in water for 24 hours and then dried to a constant weight after which time 18% of the product was water.

EXAMPLE 3

100 grams of 86% pure, 4.8% calcined gypsum was mixed with 18 cc. of water and placed in the passage 12a. The admixture was compressed by the piston 22 at a pressure of 7500 p.s.i. The resultant product was placed in a humidity chest for 24 hours and at the end of this period 17.8% of the product, which was 98.8% hydrated, was water. The density of the resultant product was 2.12 grams per cubic centimeter and the compressive strength was in excess of 12,000 p.s.i. The product was then submerged in water for 24 hours and permitted to dry to a constant weight, after which time, 18% of the product was water.

EXAMPLE 4

100 grams of 86% pure 4.8% calcined gypsum was mixed with 19 cc. of water and placed in passage 12a and compressed by piston 22 at a pressure of 7500 p.s.i. The resultant product was placed in a humidity chest for 24 hours after which time it was determined to contain 18% water, be 100% hydrated, have a density of 2.12 grams per cubic centimeter, and have a compressive strength in excess of 12,000 p.s.i. The product was then submerged in water for 24 hours and permitted to dry to a constant weight, after which time it was determined that the amount of water in the product remained constant at 18%.

EXAMPLE 5

100 grams of 86% pure, 4.8% calcined gypsum was mixed with 20 cc. of water and placed in the passage 12a and compressed by the piston 22 at a pressure of 7500 p.s.i. The resultant product was placed in a humidity chest for 24 hours after which time it was determined to be 100% hydrated and included 18% water. The density of the resultant product was 2.12 grams per cubic centimeter and the product had a compressive strength in excess of 12,000 p.s.i. It was submerged in water for 24 hours and then dried to a constant weight, after which time it was determined that the water in the product remained constant at 18%.

The above examples are set out in tabular form hereinafter in Table No. 1.

TABLE 1.—PRESSURE CONSTANT, WATER VARIED

| Example | Pressure, p.s.i. | Water, g./cc. | Density, g./cc. | Strength, p.s.i., of finished product after drying | Percent hydrated | Water, Percent, before and after soak |
|---|---|---|---|---|---|---|
| 1 | 7,500 | 16 | 2.12 | 12,000+ | 96.6 | 17.4/18.0 |
| 2 | 7,500 | 17 | 2.12 | 12,000+ | 97.7 | 17.6/18.0 |
| 3 | 7,500 | 18 | 2.12 | 12,000+ | 98.8 | 17.8/18.0 |
| 4 | 7,500 | 19 | 2.12 | 12,000+ | 100 | 18.0/18.0 |
| 5 | 7,500 | 20 | 2.12 | 12,000+ | 100 | 18.0/18.0 |

In another series of tests, set forth specifically in Examples 6 thru 10, 100 grams of 86% pure, 4.8% calcined gypsum was mixed with 20 cc. of water. Following are five examples for purposes of comparing the resultant densities, strengths, and percent hydration.

EXAMPLE 6

100 grams of 86% pure, 4.8% calcined gypsum was mixed with 20 cc. of water and placed in the passage 12a and compressed by the piston 22 at a pressure of 7500 p.s.i. The resultant product was placed in a humidity chest for 24 hours after which it included 18.0% water and was 100% hydrated. The resultant product had a density of 2.12 grams per cubic centimeter and a compressive strength in excess of 12,000 p.s.i. After the product was submerged in water for 24 hours and permitted to dry to a constant weight, the water in the product remained constant at 18%.

EXAMPLE 7

100 grams of 86% pure, 4.8% calcined gypsum was mixed with 20 cc. of water and placed in the passage 12a and compressed by the piston 22 at a pressure of 5,000 p.s.i. The resultant product was placed in a humidity chest for 24 hours after which it had 18% water and was 100% hydrated. The resultant density of the product was 2.03 grams per cubic centimeter and had a compressive strength in excess of 12,000 p.s.i. The product was submerged in water for 24 hours after which time it was determined to retain 18% water.

EXAMPLE 8

100 grams of 86% pure, 4.8% calcined gypsum was mixed with 20 cc. of water and placed in the passage 12a and compressed by the piston 22 at a pressure of 3,000 p.s.i. The resultant product was placed in a humidity chest for 24 hours after which time it included 18.0% water and was 100% hydrated. The density of the product was 1.92 grams per cubic centimeter and had a compressive strength of 7,000 p.s.i. The product was submerged in water for 24 hours after which time it was determined to retain 18% water.

EXAMPLE 9

100 grams of 86% pure, 4.8% calcined gypsum was mixed with 20 cc. of water and placed in the passage 12a and compressed by the piston 22 at a pressure of 1,000 p.s.i. The resultant product was placed in a humidity chest for 24 hours after which time it included 18.0% water by weight and was 100% hydrated. The resultant density of the product was 1.84 grams per cubic centimeter and had a compressive strength of 3,550 p.s.i. The product was then submerged in water for 24 hours after which time it was determined to retain 18% water.

EXAMPLE 10

100 grams of 86% pure, 4.8% calcined gypsum was mixed with 20 cc. of water and placed in the passage 12a and compressed by the piston 22 at a pressure of 500 p.s.i. The resultant product was placed in a humidity chest for 24 hours after which time it included 18.0% water by weight and was 100% hydrated. The resultant product had a density of 1.72 grams per cubic centimeter and had a compressive strength of 3,000 p.s.i. The product was then submerged in water for 24 hours after which time it was determined to retain 18% water, by weight.

The results of the test Examples 6 thur 10 are tabulated hereinafter in Table II, wherein the density, compressive strength, percent hydration and the percent water are shown.

TABLE II.—PRESSURE VARIED, WATER CONSTANT

| Example | Pressure, p.s.i. | Water, g./cc. | Density, g./cc. | Strength, p.s.i., of finished product after drying | Percent hydrated | Water, Percent, before and after soak |
|---|---|---|---|---|---|---|
| 6 | 7,500 | 20 | 2.12 | 12,000+ | 100 | 18.0/18.0 |
| 7 | 5,000 | 20 | 2.03 | 12,000+ | 100 | 18.0/18.0 |
| 8 | 3,000 | 20 | 1.92 | 7,000 | 100 | 18.0/18.0 |
| 9 | 1,000 | 20 | 1.84 | 3,550 | 100 | 18.0/18.0 |
| 10 | 500 | 20 | 1.72 | 3,000 | 100 | 18.0/18.0 |

It should be observed that each of the final products of Examples 6–10 was 100% hydrated even though the pressure was reduced substantially from the pressures used in Examples 1–5 i.e. 7500 p.s.i. to 500 p.s.i. In Examples 1–7, the compressive strength of each of the final products after drying was in excess of 12,000 p.s.i. which is substantially in excess of the compressive strengths of gypsum products known heretofore. Although the compressed products of Examples 1–3 were not completely hydrated, the product was still useful and was able to withstand pressures in excess of 12,000 p.s.i. In Example 4, only 19 cc. of water were required to completely hydrate 100 grams of the gypsum which results in an end product that has a compressive strength in excess of those products produced heretofore by other known methods, but which is hydrated with substantially the same amount of water as that which was withdrawn from the starting calcium sulfate. The water emanating throughout the calcined gypsum only saturates the gypsum particles sufficiently so that they will chemically unite and form a solid mass. To more particularly demonstrate the relation, 119 grams of 86% pure calcium sulphate includes approximately 21.42 grams of water. After 119 grams is calcined to 4.8% water (4.8 grams of water remaining in the sample), a minimum of 16.62 cc. of water would have to be added to completely rehydrate the sample. Because of evaporation and other losses, 2.38 grams, in addition to the 16.62 grams, or a total of 19 grams of water, was added to result in a completely hydrated product.

It should be understood that as utilized in the specification and claims, a 100 gram granulated sample of 86% pure gypsum calcined to 4.8% comprises 81.2 grams of gypsum, 4.8 grams of water, and 16 grams of dolomite type impurities such as magnesium, calcium carbonate, and silica.

Referring now more particularly to FIG. 2, the process disclosed therein is substantially similar to that of FIG. 1, however, the water is not added directly to the powdery gypsum material, but rather, the water is initially added to a porous carrier, such as expanded vermiculite or perlite, which is a porous organic substance capable of absorbing substantial amounts of water. The particle size of the perlite can vary, but may typically be such as to pass through a No. 8 screen but retained by a No. 100 screen. The water saturated carrier is then mixed with the calcined gypsum so that the water saturated granules of perlite are substantially uniformly dispersed throughout the product. The blended calcined gypsum carrier and water are placed in the passage 12a of the mold 12 and the piston 22 is again moved downwardly by the piston rod 20 to compress the material and apply substantial pressure to the mixture. The pressure causes the vermiculite or perlite carrier to be crushed so that the water is released and dispersed, or driven, under the pressure which is applied by the piston 22, throughout the mixture to recrystallize the calcined gypsum. The finished product is removed from the mold as set forth hereinbefore and permitted to harden. Because the water is expelled throughout the calcined gypsum under pressure, a minimum amount of drying time is required because substantially all of the water goes into chemical combination.

Following are five examples utilizing 100 grams of 86% pure, 4.8% calcined gypsum which is mixed with a constant amount of porous carrier to which various amounts of water are successively added in the various tests.

In each of the examples, various amounts of water were added to five grams of expanded perlite as a carrier. The perlite utilized had a bulk density of 8.5 pounds per cubic foot.

EXAMPLE 11

100 grams of 86% pure, 4.8% calcined gypsum was mixed with 5 grams of perlite carrying 16 cc. of water. The mixture was placed in the passage 12a and compressed by the piston 22 at a pressure of 7500 p.s.i. The resultant product was placed in a humidity chest for 24 hours and the resultant product had 16.8% water and was 97.7% hydrated. The resultant product had a density of 1.92 grams per cubic centimeter and a minimum compressive strength of 5,680 p.s.i. After the product was submerged in water for 24 hours, the resultant product then contained 17.2% water after the product was permitted to dry to a constant weight.

EXAMPLE 12

100 grams of 86% pure, 4.8% calcined gypsum was mixed with 5 grams of perlite carrying 17 cc. of water. The mixture was placed in the passage 12a and compressed by the piston 22 at a pressure 7500 p.s.i. The resultant product was then placed in a humidity chest for 24 hours after which time 17.0% of the product was water and the product was determined to be 98.9% hydrated, had a density of 1.92 grams per cubic centimeter and a minimum compressive strength of 5,680 p.s.i. The product was then submerged in water for 24 hours and permitted to dry to a constant weight. After 24 hours 17.2% of the product was water.

EXAMPLE 13

100 grams of 86% pure, 4.8% calcined gypsum was mixed with 5 grams of perlite carrying 18 cc. of water. The mixture was placed in the passage 12a and compressed by the piston 22 at a pressure of 7500 p.s.i. The resultant product was placed in a humidity chest for 24 hours after which time, it was determined to contain 17.2% water and was 100% hydrated. The resultant product had a density of 1.91 grams per cubic centimeter and a compressive strength of 5,680 p.s.i. minimum. The product was then submerged in water for 24 hours, after which time it contained 17.2% water.

EXAMPLE 14

100 grams of 86% pure, 4.8% calcined gypsum was mixed with 5 grams of perlite carrying 18 cc. of water. The mixture was placed in the passage 12a and compressed by the piston 22 at a pressure of 7500 p.s.i. The resultant product was placed in a humidity chest for 24 hours, after which time it was determined to contain 17.2% water and was 100% hydrated. The resultant product had a density of 1.90 grams per cubic centimeter and a compressive strength of 5,680 p.s.i. minimum. The product was then submerged in water for 24 hours after which time it was determined to contain 17.2% water.

EXAMPLE 15

100 grams of 86% pure, 4.8% calcined gypsum was mixed with 5 grams of perlite carrying 20 cc. of water. The mixture was placed in the passage 12a and compressed by the piston 22 at a pressure of 7500 p.s.i. The resultant product was placed in a humidity chest for 24 hours, after which time it contained 17.2% water and was 100% hydrated. The product was then submerged in water for 24 hours after which time it contained 17.2% water.

The results of test Examples 11–15 are tabulated hereinafter in Table III.

EXAMPLE 16

100 grams of 86% pure, 4.8% calcined gypsum was mixed with 5 grams of perlite carrying 20 cc. of water. The admixture was placed in the passage 12a and compressed by the piston 22 at a pressure of 7500 p.s.i. The resultant mixture was permitted to dry in the humidity chest for 24 hours after which time, it was determined to have 17.2% water and was 100% hydrated. The resultant product had a density of 1.87 grams per cubic centimeter and a minimum compressive strength of 5,680 p.s.i. The product was then submerged in water for 24 hours and permitted to dry to a constant weight after which time it was determined that the percent water remained constant at 17.2%.

EXAMPLE 17

100 grams of 86% pure, 4.8% calcined gypsum was mixed with 5 grams of perlite carrying 20 cc. of water. The admixture was placed in the passage 12a and compressed by the piston 22 at a pressure of 5000 p.s.i. The resultant product was placed in a humidity chest for 24 hours after which time it was determined that the product contained 17.2% water and was 100% hydrated. The product had a density of 1.85 grams per cubic centimeter and a minimum compressive strength of 5,680 p.s.i. The product was then submerged in water for 24 hours after which time it was determined that the percent water remained constant at 17.2%.

EXAMPLE 18

100 grams of 86% pure, 4.8% calcined gypsum was mixed with 5 grams of perlite carrying 20 cc. of water and the admixture was compressed by the piston 22 at a pressure of 3000 p.s.i. The resultant product contained 17.2% water, was 100% hydrated, and had a density of 1.76 grams per cubic centimeter and a minimum compressive strength of 5680 p.s.i. The product was then submerged in water for 24 hours after which time, it was determined that the percent water in the product remained constant at 17.2%.

EXAMPLE 19

100 grams of 86% pure, 4.8% calcined gypsum was mixed with 5 grams of expanded perlite carrying 20 cc. of water and placed in the passage 12a. The admixture was compressed by the piston 22 at a pressure of 1000 p.s.i. The resultant product contained 17.2% water and was 100% hydrated, had a density of 1.54 grams per cubic centimeter, and had a compressive strength of 3200 p.s.i. The resultant product was then submerged in water

TABLE III.—PRESSURE AND CARRIER CONSTANT, WATER VARIED

| Example | Pressure, p.s.i. | Water, g./cc. | Carrier, grams | Density, g./cc. | Strength, p.s.i., of finished product after drying | Percent hydrated | Water, percent, before and after soak |
|---|---|---|---|---|---|---|---|
| 11 | 7,500 | 16 | 5 | 1.92 | a 5,680 | 97.7 | 16.8/17.2 |
| 12 | 7,500 | 17 | 5 | 1.92 | a 5,680 | 98.9 | 17.0/17.2 |
| 13 | 7,500 | 18 | 5 | 1.91 | a 5,680 | 100 | 17.2/17.2 |
| 14 | 7,500 | 19 | 5 | 1.90 | a 5,680 | 100 | 17.2/17.2 |
| 15 | 7,500 | 20 | 5 | 1.87 | a 5,680 | 100 | 17.2/17.2 | a Minimum.

It should be observed, that in Example 13, only 18 cc. of water, which is substantially equal to that water driven off from the calcium sulphate, needed to be added to the calcined gypsum to achieve a completely hydrated product. The compressive strengths of Examples 11–15 are substantially less than the tests set forth in Examples 1–5.

In the next five examples, 20 cc. of water was added to 5 grams of perlite having a density of 8.5 pounds per cubic foot and the saturated perlite was added to 100 grams of 4.8% calcined gypsum having a purity of 86%. In each of the examples, the pressure was varied for purposes of comparing the density, the compressive strength, and the percent hydration.

for 24 hours after which time it was determined that the percent water in the product remained constant at 17.2%.

EXAMPLE 20

100 grams of 86% pure, 4.8% calcined gypsum was mixed with 5 grams of expanded perlite carrying 20 cc. of water. The admixture was placed in the passage 12a and compressed by the piston 22 at a pressure of 500 p.s.i. The resultant product had 17.2% water and was 100% hydrated, had a density of 1.43 grams per cubic centimeter and a compressive strength of a minimum of 2850 p.s.i. The product was then submerged in water for 24 hours after which time it was determined that the percent water remained constant at 17.2%.

The results of Examples 16–20 are tabulated below in Table IV.

TABLE IV.—WATER AND CARRIER CONSTANT, PRESSURE VARIED

| Example | Pressure, p.s.i. | Water, g./cc. | Carrier, grams | Density, g./cc. | Strength, p.s.i., of finished product after drying | Percent hy-drated | Water, percent, before and after soak |
|---|---|---|---|---|---|---|---|
| 16 | 7,500 | 20 | 5 | 1.87 | ᵃ 5,680 | 100 | 17.2/17.2 |
| 17 | 5,000 | 20 | 5 | 1.85 | ᵃ 5,680 | 100 | 17.2/17.2 |
| 18 | 3,000 | 20 | 5 | 1.76 | ᵃ 5,680 | 100 | 17.2/17.2 |
| 19 | 1,000 | 20 | 5 | 1.54 | ᵃ 3,200 | 100 | 17.2/17.2 |
| 20 | 500 | 20 | 5 | 1.43 | ᵃ 2,850 | 100 | 17.2/17.2 |

ᵃ Minimum.

It should again be noted that the final product was 100% hydrated even though the pressure was reduced substantially from 7500 p.s.i. to 500 p.s.i.

In the final three tests, the water added to the sample and the pressure at which the admixture was compressed was maintained constant, however, the amount of carrier utilized varied. The carrier utilized was expanded perlite having a density of 8.5 pounds per cubic foot. In each of the following examples, 100 grams of calcined gypsum was added to 17 cc. of water carried by the carrier.

EXAMPLE 21

100 grams of 86% pure, 4.8% calcined gypsum was mixed with 2 grams of expanded perlite carrying 17 cc. of water. The admixture was placed in the passage 12a and compressed by the piston 22 at a pressure of 1000 p.s.i. The resultant product was placed in a humidity chest for 24 hours after which time, it was determined to include 17.4% water and was 98% hydrated. The resultant product had a density of 1.62 grams per cubic centimeter and minimum presure of 4550 p.s.i. The product was then submerged in water for 24 hours, after which time it was dried to a constant weight and determined to contain 17.6% water by weight.

EXAMPLE 22

100 grams of 86% pure, 4.8% calcined gypsum was mixed with 5 grams of expanded perlite saturated with 17 cc. of water. The admixture was placed in the passage 12a and compressed by the piston 22 at a pressure of 1000 p.s.i. The resultant product was placed in a humidity chest for 24 hours after which time it was determined to have 17.2% water and was 100% hydrated. The resultant product had a density of 1.49 grams per cubic centimeter and a minimum compressive strength of 3150 p.s.i. The product was then submerged in water for 24 hours and dried to a constant weight and determined to contain 17.2% water by weight.

EXAMPLE 23

100 grams of 86% pure, 4.8% calcined gypsum was mixed with 10 grams of expanded perlite saturated with 17 cc. of water. The admixture was placed in the passage 12a and compressed by the piston 22 at a pressure of 1000 p.s.i. The resultant product was placed in a humidity chest for 24 hours after which time it was determined to contain 15.6% water and was 100% hydrated. The resultant product had a density of 1.37 grams per cubic centimeter and a minimum compressive strength of 2100 p.s.i. The resultant product was then submerged in water for 24 hours and permitted to dry to a constant weight after which time it was determined that the water content maintained constant at 58.6%.

The results of Examples 21–23 are tabulated in Table V.

TABLE V.—WATER AND PRESSURE CONSTANT, CARRIER VARIED

| Example | Pressure, p.s.i. | Water, g./cc. | Carrier, grams | Density, g./cc. | Strength, p.s.i., of finished product after drying | Percent hy-drated | Water, percent, before and after soak |
|---|---|---|---|---|---|---|---|
| 21 | 1,000 | 17 | 2 | 1.62 | ᵃ 4,550 | 98.0 | 17.4/16.6 |
| 22 | 1,000 | 17 | 5 | 1.49 | ᵃ 3,150 | 100 | 17.2/17.2 |
| 23 | 1,000 | 17 | 10 | 1.37 | ᵃ 2,100 | 100 | 15.6/15.6 |

ᵃ Minimum.

A review of the tests indicates that whether the water is introduced with or without the carrier, that a substantially hydrated product results with a minimum quantity of water being added to the calcined gypsum. The resulting compressive strengths indicate that the product is much stronger than that known heretofore.

The process is carried out in each instance by mixing the water and gypsum in the mold passage 12a and compressing the admixture. Water is dispersed throughout the gypsum into the fissures of the individual gypsum particles. A chemical bond is formed between the water and gypsum to result in a solid crystalline mass. Becaused only the minimum amount of water is added to the mixture the drying time is reduced at least 50%. In addition, the voids normally resulting from the use of excess water in slurry processes have been eliminated, and a final product having substantially increased compressive strength results.

The moisture content and percent hydration was measured with the moisture testers such as that sold by Cenco Corporation, Chicago, Ill., under the trademark "Moisture Balance."

Figure 6:
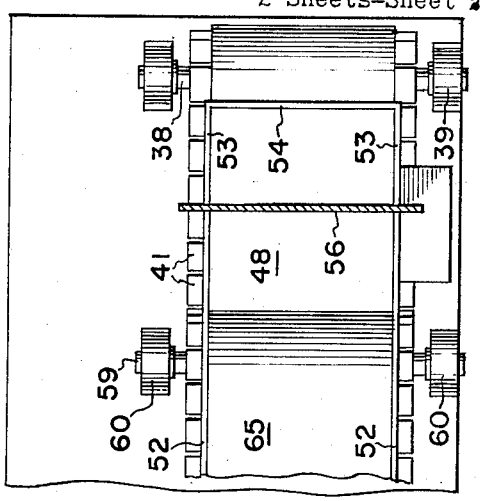
FIG. 6 is a partial top plan view taken along the line 6—6 of FIG. 4.
Figure 5:
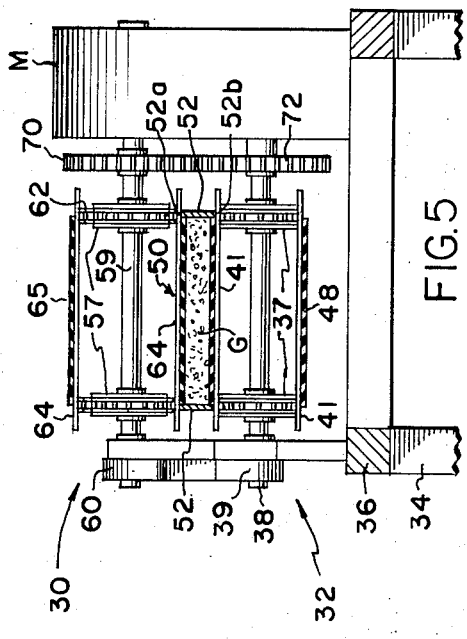
FIG. 5 is a sectional end view, taken along the line 5—5 of FIG. 4.

The method of the present invention may also be put into practice with apparatus illustrated in FIGS. 4–6 comprising upper and lower endless conveying and compressing assemblies, generally designated 30 and 32, respectively, mounted on a frame, generally designated F', comprising a plurality of vertical posts 34 spanned by horizontal support members 36. The lower compressing assembly 32 comprises a slat conveyor, generally designated 32a, including pairs of sprocket wheels 37 fixed to a pair of longitudinally spaced shafts 38 journaled in pairs of frame-supported bearings 39. A pair of link chains 40 are trained around the sprocket wheels 37 and a plurality of longitudinally spaced slats 41 spanning the chains 40.

The lower conveying and compressing assembly 32 also includes a forward idler roll 44 fixed to a shaft 45 journaled in suitable bearings 46a provided in the frame supported members 46. A continuous, steel or rubber conveying and compressing belt 48 is trained around the forward roll 44 and the portion of the slats negotiating the rear pair of sprockets 37. The portions of the upper and lower runs of the conveying and compressing belt 48 adjacent the upper and lower runs of the slat conveyor 32a are frictionally engaged by the slat conveyor 32a so as to be driven thereby.

Disposed above the lower conveying and compressing assembly 32 is a pair of side walls 52, fixed to the frame F by suitable supports 49, defining a compressing chamber, generally designated 50. As is illustrated in FIG. 4, the side walls 52 include deep rear side wall portions 53 spanned by a rear end wall 54 to define a feed hopper 55, in which an admixture comprising calcined gypsum and water is introduced. A leveling plate 56 rests on the chamber side walls 53 and is slidable in a to-and-fro path to level the gypsum in the hopper 55.

Each of the chamber side walls 52 includes a lower edge surface 58 in sliding engagement with the slats 41 of the upper run of the slat conveyor 32a and an upper edge surface 55 which is inclined forwardly, downwardly toward the lower edge surface 58, to an area 52c. Downstream of the area 52c, the upper and lower edge surface 52a and 52b diverge. The belt 48 which is supported by the slat conveyor 32a, is disposed between the side walls 52 and the width of the belt 48 is such as to be in sealing, but sliding, engagement with the side walls 52.

The upper conveying and compressing assembly 30 includes pairs of sprocket wheels 57 fixed to a pair of longitudinally spaced shafts 59 journaled in frame supported bearings 60. A pair of link conveyor chains 62 are trained around the sprocket wheels 56 and mounts slats 64 which span the chains 62. A roll 66, fixed to a shaft 68 journaled in a vertically movable frame supported bearing 70, bears against the upper side of the lower run of the slats 64 so that the slats 64 along the lower run of the conveyor 32a are diverted downwardly out of a horizontal path and the lower sides of the slats 64 ride along the upper edge surface 52a of the side walls 52. Pressed onto the slats 64 is a continuous resilient or steel belt 65 having a width substantially equal to the width of belt 48 and also equal to the distance between the side walls 52 so as to be in sliding, but sealing, engagement therewith.

The endless belt 48 on the lower conveying and pressing assembly 32 extends substantially forwardly of the discharge end of the upper endless conveying assembly 30. It has been found that if the lower conveying belt 48 is snugly fitted around the forward, as well as the rearward, ends of the entire slat conveyor 32a, the finished compressed product B tends to follow the belt 48 as it negotiates the forward sprockets 39 after it has been compressed between the upper and lower conveyor belts 65 and 48. With the present construction, the compressed material will continue along in a longitudinal path.

Apparatus for driving the conveyor supported upper and lower shafts 59 and 38 in opposite directions of rotation comprises a frame supported electric motor, generally designated M, directly connected to the upper conveyor shaft 58 having a gear 70 fixed thereto and intermeshed with a gear 72 fixed to the lower conveyor drive shaft 38. At the confluence of belts 48 and 65 adjacent the roll 66, the portion of the belts 48 and 65 adjacent the rolls 66 form a nip between which the material is pressed at a maximum compression station. The chamber side walls 52 diverge forwardly of the nip so as to release some of the pressure on the compressed board B so that it will tend not to follow the upper and lower conveyor belts 65 and 48.

An additional conveyor 75, trained around conveyor rolls 76 is positioned downstream of conveyor belt 48 to receive the pressed board B from conveyor 48.

In the operation of the apparatus illustrated in FIGS. 4–6, calcined gypsum material is placed in the hopper 55 with appropriate amounts of water. If desired, the water may be introduced by means of a carrier, such as vermiculite or perlite. Other filler may also be added to decrease the density of the finished product. The amounts of calcined gypsum, water, carrier and filler may be added in amounts directly proportional to those amounts set forth above in Tables I–V. The motor M is energized so as to drive the conveying and pressing assemblies 30 and 32. The mixture G of water and calcined gypsum will be frictionally dragged forwardly by the conveyor belts 48 and 65 and be compressed between the upper and lower belts 65 and 48 as it is moved forwardly to the nip adjacent the rolls 66 to disperse the water throughout the gypsum and form a compressed board B, having a thickness t, which is substantially completely hydrated with a minimum amount of water. As the material is moved forwardly toward the forming nip adjacent the rolls 66, the pressure is increased. As the material moves downstream of the nip in block form, the pressure is increasingly diminished. The continuous board B, which is continuously formed, is discharged from the belt 48 onto the discharge conveyor belt 75. The amount of water which is added to the calcined gypsum is substantially no greater than that which was initially driven off to achieve the calcined gypsum. The board B may then be cut into appropriate lengths.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

What I claim is:

1. The process of producing a high density building product with calcined gypsum and water, which is capable of combining with the calcined gypsum to produce a set product comprising the steps of:
    uniformly diffusing said water, under pressure, throughout the calcined gypsum to rehydrate the calcined and form a high density building product; and
    permitting the resulting mixture to set and harden;
    said diffusing step being accomplished by saturating water absorbent, crushable material with water, mixing the water saturated material with the calcined gypsum, and then applying pressure to the admixture of water, crushable material and gypsum to crush the water absorbent material and uniformly distribute the water throughout the calcined gypsum.

2. The process of producing a high density building product with calcined gypsum and water, which is capable of combining with the calcined gypsum to produce a set product comprising the steps of:
    adding water to water absorbent material, which acts as a carrier for the water, and mixing the water carrying, water absorbent material with said calcined gypsum;
    applying pressure to the admixture of gypsum and water to crush the water absorbent material and expel the water carried thereby uniformly throughout the calcined gypsum to rehydrate the calcined gypsum and form a high density building product; and
    permitting the resulting mixture to set and harden.

3. The method set forth in claim 2 wherein the amount of water added to the water absorbent material is substantially no greater than the minimum necessary to achieve complete rehydration of the calcined gypsum.

References Cited

UNITED STATES PATENTS

| | | | |
|---|---|---|---|
| 1,703,097 | 2/1929 | Chassevent | 106—110 |
| 2,366,673 | 1/1945 | Paley | 106—110 X |

DELBERT E. GANTZ, Primary Examiner

S. L. BERGER, Assistant Examiner

U.S. Cl. X.R.

106—DIG 2; 425—371